United States Patent [19]

Arvan

[11] 4,072,048
[45] Feb. 7, 1978

[54] INDICATING APPARATUS FOR MEASURING THE PRESSURE OF A FLUID WITHIN A CONTAINER

[76] Inventor: John Arvan, 61 S. Regent St., Port Chester, N.Y. 10573

[21] Appl. No.: 672,657

[22] Filed: Apr. 1, 1976

[51] Int. Cl.² ............................................. B60C 23/02
[52] U.S. Cl. ..................................... 73/146.8; 137/228
[58] Field of Search ...................... 116/34 R; 73/146.8; 137/227, 228

[56] References Cited

U.S. PATENT DOCUMENTS

| 2,167,456 | 7/1939 | Hooper | 116/34 R |
|---|---|---|---|
| 3,236,097 | 2/1966 | Tessmer | 116/34 R |
| 3,670,688 | 6/1972 | Seaberg | 73/146.8 |
| 3,789,867 | 2/1974 | Yabor | 73/146.8 X |
| 3,889,530 | 6/1975 | Bluem | 73/146.8 |

Primary Examiner—Daniel M. Yasich

Attorney, Agent, or Firm—McAulay, Fields, Fisher & Goldstein

[57] ABSTRACT

An indicating apparatus for measuring the pressure of a fluid within a container, such as a tire, which includes a housing adapted to be mounted on the tire valve assembly. A plunger is supported within the housing for movement between an inoperable position wherein the tire valve is closed and a first operate position wherein the valve is opened to permit fluid from the tire to enter the housing. An indicator piston is supported within the housing for movement to an indicating position representative of the pressure within the tire, which position is exposed to view through the housing. The apparatus further provides for movement of the plunger to a second operate position wherein the valve is opened to permit pressure from an external source to be transmitted to the tire through the apparatus without having to remove the apparatus from the tire valve assembly.

9 Claims, 10 Drawing Figures

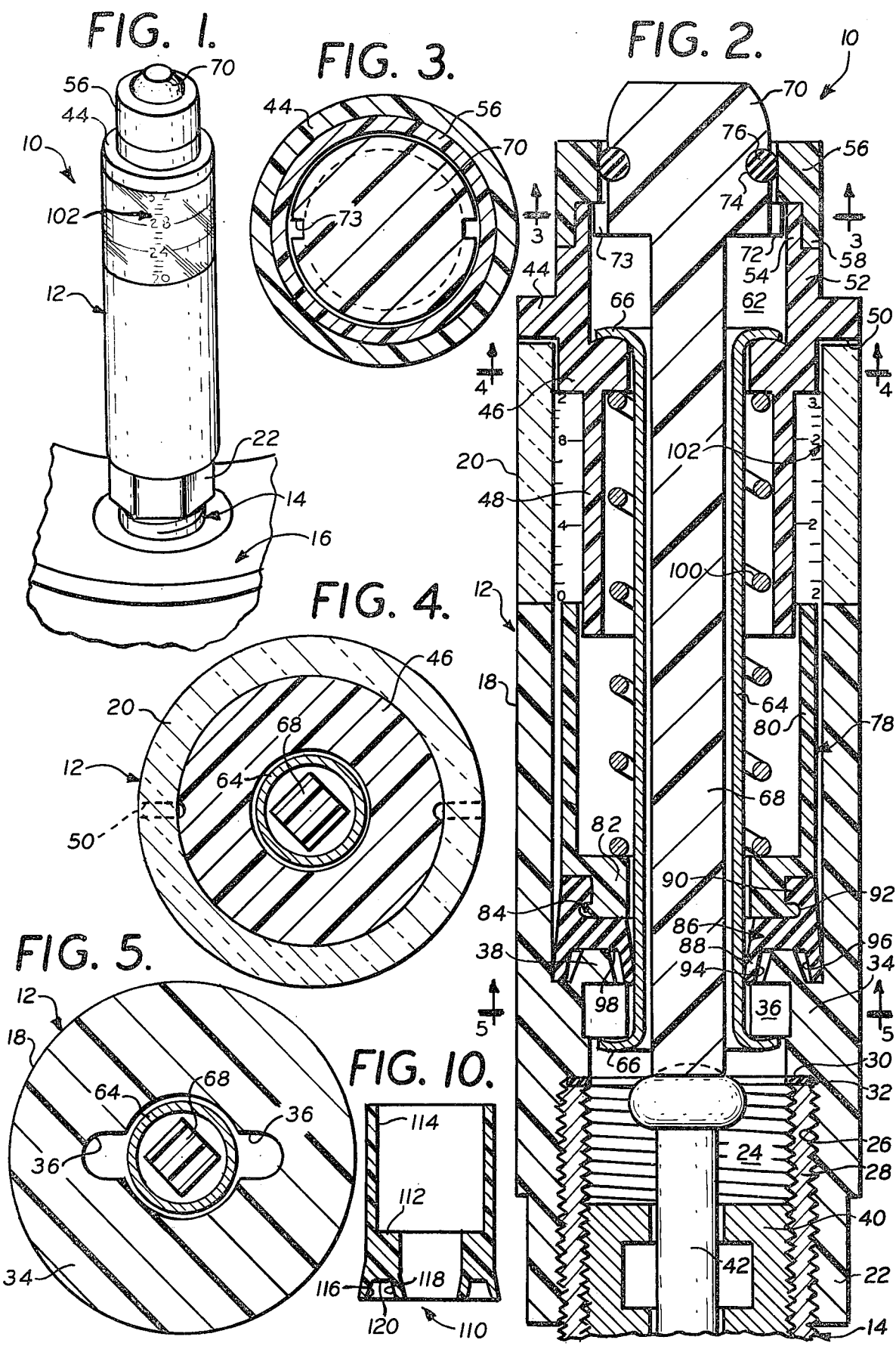

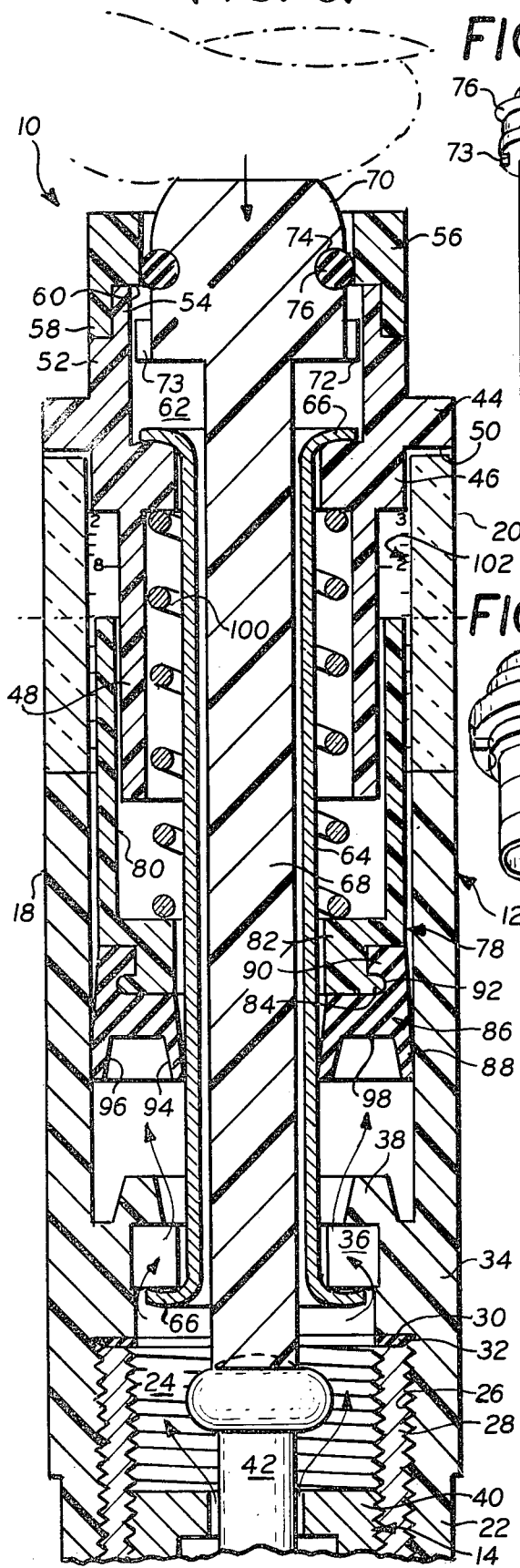
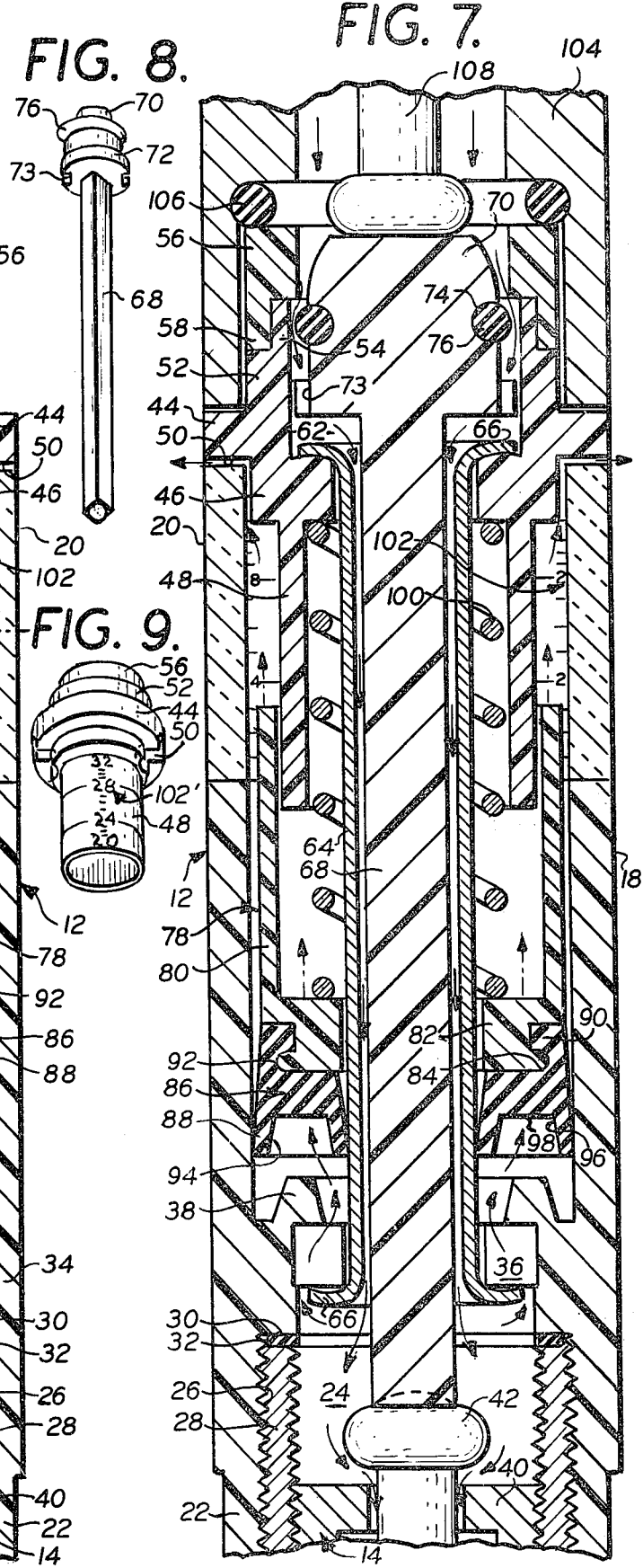

INDICATING APPARATUS FOR MEASURING THE PRESSURE OF A FLUID WITHIN A CONTAINER

BACKGROUND OF THE INVENTION

1. Field of the Invention

This invention relates generally to an indicating apparatus for measuring the pressure of a fluid within a container, and, more particularly, to an indicating apparatus adapted to be mounted on a valve assembly of an automobile tire to selectively measure the air pressure within the tire when said pressure is between a predetermined range of pressures. The apparatus further permits pressure from an external source to be transmitted to the tire through the apparatus without having to remove the apparatus from the tire valve assembly.

DESCRIPTION OF THE PRIOR ART

The dangers associated with driving an automobile or other vehicle having underinflated or overinflated tires is a matter of concern repeatedly stressed by tire manufacturers and car makers. For example, an underinflated tire wears rapidly along its outer tread areas, flexes too much and overheats. It impairs the car's handling and lowers gasoline mileage. An overinflated tire, on the other hand, tends to wear faster at its center tread area, rides more harshly and may not flex enough to ward off damage during impacts. The penalties for not maintaining proper inflation of the tire are reflected in the cost of untimely tire replacement, and, more importantly, in the safety hazard associated with a blowout with the resulting likelihood of loss of control of the vehicle.

Heretofore, in order for the driver of the vehicle to measure the air pressure within the tire, it was customary to drive up to the air pump at a service station and measure the pressure by means of a meter or other indicating apparatus formed as an integral part of the air pump. However, as is often the case, the meters or indicating apparatus on such pumps are unreliable and the driver is hardly ever sure that the measured reading is correct. Even where the service station apparatus is reliably accurate, the driver is still relegated to the time consuming procedure of having to drive to the station to measure the tire pressure. This, in itself, is not wasteful if the measurement informs the driver of improper inflation of the tire. However, the traveling time to the station and the resulting use of gasoline is indeed wasteful if the measurement reveals correct inflation. Accordingly, there is need to provide a portable indicating apparatus (commonly referred to as tire gauge) that can be used by the driver to measure the air pressure within the tires without having to first drive to a service station to perform such measurement.

It has thus been proposed to provide a relatively inexpensive and portable tire gauge which can be used by the driver at his convenience to measure tire inflation. Such gauges are typically pencil-shaped extending approximately 6 inches in length. In use, one end of the gauge is pressed against the tire valve which serves to displace the valve core to an open position. The pressure within the tire is then permitted to enter the gauge housing and force a calibrated bar or piston out the other end of the gauge. In other variations of such gauges, the measured pressure is indicated by a pointer on the circular face of a dial gauge.

While the above noted tire gauges are indeed portable, they often breakdown due to faulty construction, thereby subjecting the accuracy of the indicated measurement to suspicion. Furthermore, the length of the known gauges is such that they cannot be left on the tire valve during periods when the car is being driven. This requires that the gauge be carried either personally by the driver or left inside the car or at some other location where it is subject to being misplaced.

It has also been proposed to provide an automatic pressure warning device for a pneumatic unit, such as an automobile tire, which is adapted to be secured to the tire valve for use even while the vehicle is in motion. For example, such a device is disclosed in U.S. Pat. No. 3,593,268 which issued to the applicant herein, and which informs the occupants when the tire pressure goes below or above a certain predetermined range.

The present invention provides an improved indicating apparatus which is adapted to be mounted on the tire valve and which is intended to be left in its mounted condition for use and operation whenever desired.

SUMMARY OF THE INVENTION

The indicating apparatus of the present invention includes a housing adapted to be mounted on a tire valve assembly. The housing is provided with a fluid inlet for the introduction of air pressure from the tire. A plunger is reciprocally supported within the housing for movement between an inoperable position wherein the tire valve is closed and a first operate position wherein the plunger engages and opens the valve to provide a path for the flow of air pressure from the tire into the fluid inlet of the housing. Indicator means are supported within the housing for movement to an indicating position representative of the air pressure within the tire. In this regard, a passage is provided within the housing for directing the said air pressure from the fluid inlet of the housing to the indicator means when the plunger is in its operate position. The housing is further formed with transparent or other viewing means for viewing the indicator in its indicating position. In operation, the apparatus is of such length that it can remain mounted on the tire valve assembly for indefinite periods. Thus, the driver need only displace the plunger to its first operate position whenever he wishes to check the pressure within the tire, and by observing the position of the indicator means, he can obtain a measurement representative of the pressure within the tire.

Another feature of the invention resides in the provision whereby pressure from an external source can be transmitted to the tire through the indicating apparatus without having to remove said apparatus from the tire valve assembly. In this regard, the housing is further provided with a source inlet for the introduction of air pressure from the external source, such as a conventional service station air pump or compressor. A sleeve is supported within the housing connecting the fluid inlet to the source inlet. The arrangement is such that movement of the plunger to a second operate position serves to open the tire valve and also provide a path for the flow of fluid from the external source to the source inlet of the housing. The pressure from the external source then passes through the sleeve connecting the source inlet with the fluid inlet, and through the tire valve into the tire.

Accordingly, an object of the present invention is to provide an indicating apparatus that is mounted on a valve assembly of the tire, and which is intended to be left in such mounted position for use by the driver to selectively measure the air pressure within the tire as required.

Another object and feature of the present invention is to provide an indicating apparatus that is mounted on a valve assembly of the tire, and which permits fluid from an external source to be transmitted to the tire through the indicating apparatus.

A further object, feature and advantage of the present invention is to provide an indicating apparatus which enables the driver to measure the pressure within the tires of the automobile without having to first drive to a service station, and which does not require the assistance of service station attendants or mechanics. Another object, feature and advantage of the present invention is to provide an indicating apparatus for measuring the pressure of a fluid within a container, which apparatus is relatively inexpensive to manufacture and is reliable in use.

The above description, as well as further objects, features and advantages of the present invention will be more fully appreciated by reference to the following detailed description of the preferred embodiments of the invention when taken in conjunction with the accompanying drawings.

BRIEF DESCRIPTION OF THE DRAWINGS

FIG. 1 is an elevational view of an indicating apparatus constructed in accordance with the present invention, and mounted on a valve assembly of a container;

FIG. 2 is an enlarged elevational view, with parts in section, of the indicating apparatus shown in FIG. 1;

FIG. 3 is a sectional view taken through line 3—3 of FIG. 2;

FIG. 4 is a sectional view taken through line 4—4 of FIG. 2;

FIG. 5 is a sectional view taken through line 5—5 of FIG. 2;

FIG. 6 is a view similar to FIG. 2 illustrating the position of the apparatus when measuring the pressure of the fluid within the container;

FIG. 7 is a view similar to FIG. 2 illustrating the position of the apparatus for transmitting fluid from an external source through the apparatus and into the container;

FIG. 8 is a perspective view of the plunger member of the apparatus;

FIG. 9 is a perspective view of the housing collar member of the apparatus having indicia marking therein, and FIG. 10 is an elevational view, with parts in section, of another embodiment of the sealing member constructed as being integrally formed with the piston indicator of the apparatus.

DESCRIPTION OF THE PREFERRED EMBODIMENTS

Referring to the drawings, and more particularly to FIGS. 1-6, 8 and 9, there is illustrated an indicating apparatus 10 constructed in accordance with the present invention. Apparatus 10 includes a housing 12 adapted to be mounted on a valve assembly 14 of a container 16 containing a fluid under pressure. In the specific application of use herein described, container 16 is a conventional automobile tire adapted to be inflated to a selected air pressure; however, it will be appreciated that apparatus 10 is not limited for use only with such tires and is applicable for measuring the pressure of a fluid within any other container.

Housing 12 is of cylindrical shape and is preferably formed having a lower opaque portion 18 and an upper transparent portion 20. The cylindrical shape of housing 12 is purely illustrative and is not to be deemed a limitation of the present invention. The lower end 22 of housing portion 18 is formed having a fluid inlet chamber 24 for the introduction of air pressure from tire 16. In this regard, inlet chamber 24 is formed having internal threads 26 adapted to engage with external threads 28 conventionally provided on tire valve assembly 14. The distant end of inlet chamber 24 has a shoulder 30 for receiving a sealing member 32, if necessary, which sealingly engages with the free end of tire valve assembly 14 when lower housing portion 18 is mounted on said valve assembly. An annular flange 34 is located adjacent shoulder 30 and is formed having a pair of diametrically spaced enlarged openings 36 to permit fluid to be transmitted from the tire through the apparatus. A pair of diametrically spaced arcuate posts 38 project upwardly from flange 34 to limit downward movement of an indicator piston as noted more fully in connection with the description of the operation of the apparatus.

The construction of tire valve assembly 14 does not form part of the invention and is hereinafter described merely to provide background for a proper understanding of the invention. Thus, valve assembly 14 includes a tire valve core 40 threadedly mounted therein and through which is supported a spring biased pin 42. The pin is normally displaced under influence of a spring (not shown) to the position illustrated in FIG. 2 which represents the closed position of the tire valve. In order to open the valve, a force has to be exerted on pin 42 to displace the pin inwardly to provide a path for the flow of fluid either from or to the tire 16 depending on the use of apparatus 10 as hereinafter described.

The upper end of housing portion 20 is adapted to receive a collar member 44 thereon having a depending annular flange 46 of reduced diameter which is received within the upper end of said housing. Flange 46 is formed having an elongated annular neck portion 48 projecting downwardly as viewed in FIG. 2. Neck portion 48 is spaced inwardly of housing upper portion 20 with its distant end projecting beyond the area of transparency of said housing portion. A plurality of spaced grooves 50 are formed in the bottom surface of collar 44 and extend downwardly along the recessed side surface of flange 46 to provide a plurality of vent openings when the apparatus is in use. Collar member 44 further includes an upstanding annular flange 52 of reduced diameter which terminates in a recessed surface defining an annular neck portion 54.

Housing 12 includes another collar member 56 formed having a recessed inner surface to define a depending outer annular rim 58 which is adapted to seat on annular flange 52. The arrangement is such that when collar member 44 and 56 are nested together, the neck portion 54 of flange 52 abuts against the recessed inner surface of collar member 56. Collar member 56 is retained in its seated position on collar member 44 by means of cement or the like. The recessed portion of collar member 56 projects radially inwardly of housing 12 beyond the inner surface of neck portion 54 to define a lip or shoulder 60, as viewed in FIG. 6, as noted more fully in connection with the description of the operation of the apparatus.

Collar members 44 and 56 define a source inlet chamber 62 for the introduction of air pressure from an external source, such as a conventional service station air pump or compressor. A description of the operation of the apparatus which permits fluid from an external source to be transmitted to the tire through the apparatus is noted more fully in connection with the description of FIG. 7.

A sleeve 64 is supported within housing 12 connecting fluid inlet chamber 24 and source inlet chamber 62 to provide a path for the flow of fluid therebetween. As will become apparent from a description of the assembly of the apparatus, the opposite ends 66 of sleeve 64 are bent radially outwardly in overlying relation to portions of annular flange 34 and collar member 44, respectively, to secure collar member 44 in nested relation to housing 12. Reciprocally supported within sleeve 64 is a plunger 68 disposed for movement between an inoperable position wherein tire valve pin 42 is closed and a first operate position wherein the bottom edge of plunger 68 disengages and displaces said valve pin 42 to its open position to provide a path for the flow of air pressure from the tire into housing inlet chamber 24. If desired, and as noted in the drawings, the top edge of valve pin 42 may be of spherical shape and the bottom edge of plunger 68 may be formed with a complementary shaped recess to receive the spherical head of valve pin 42 upon movement of plunger 68 to its operate position.

The upper end of plunger 68 is formed having an enlarged head 70 which projects beyond collar member 56. The lower portion of head 70 is formed having a flange 72 which extends radially outwardly of head 70. The crosswise dimension of flange 72, as viewed in FIGS. 2 and 6, is greater than the corresponding internal dimension of collar member 56 whereby flange 72 is disposed to engage with the lip or shoulder 60 of collar member 56 to limit outer movement of plunger 68 beyond its inoperable position. A plurality of spaced grooves 73 are formed in the side surfaces of flange 72 to permit the flow of fluid from the external source to the source inlet chamber 62 when apparatus 10 is used for transmitting fluid from the source to the tire 16 through the housing 12. An annular groove 74 is formed in the outer surface of head 70, approximately midway between flange 72 and its exposed end, and receives a sealing ring 76 which slideably engages the inner wall surfaces of collar member 56 upon reciprocating movement of plunger 68 between its inoperable and first operate positions. Plunger 68 is normally biased to its inoperable position by a spring (not shown) conventionally associated with tire valve assembly 14 when the apparatus is not in use.

Supported within housng 12 is indicator means represented generally by numeral 78 disposed for movement by air pressure within the tire to an indicating position representative of said pressure. Indicator means 78 preferably includes a piston 80 of generally cylindrical shape having a recessed collar portion 82 at its lower end which is formed having an annular flange 84 projecting radially and outwardly of the collar portion. The arrangement is such that piston 80 is positioned between sleeve 64 and the interior walls of housing 12.

Indicator means 78 further includes a sealing member, designated generally by numeral 86, which is formed having a body sealing portion 88 and a collar portion 90. Collar 90 is formed having an annular recessed groove 92 which is adapted to frictionally receive flange 84 for mounting sealing member 86 on piston 80 for conjoint movement therewith. The outer surface of sealing member 86 tapers outwardly from the top edge to the bottom edge, and the inner wall surface of the through-opening tapers inwardly from the top edge of body sealing portion 88 to the bottom edge thereof. The result is to locate the outer and inner wall surfaces in diverging relation with the radial dimension of body sealing portion 88 being greater at the bottom edge thereof. The bottom edge is further formed having spaced circumferentially depending walls 94, 96 defining a groove 98 therebetween. The construction is such that sealing member 86 is formed of resilient material with resilient walls 94, 96 disposed in diverging relation to one another.

Indicating means 78 further includes a compression spring 100 coiled around sleeve 64 and positioned between the collar portion 82 of piston 80 and the flange 46 of collar 44. The arrangement is such that spring 100 biases piston 80 downwardly to its normally rest or non-indicating position. Accordingly, piston 80 may be considered as being reciprocally mounted within housing 12 for movement between a non-indicating position as illustrated in FIG. 2 and an indicating position as illustrated in FIG. 6. In this regard, the lower opaque portion 18 of housing 12 serves to mask position 80 when said piston is in its non-indicating position.

Fluid communication between tire 16 and indicator means 78 is achieved by means of the enlarged openings 36 in flange 34 whereby fluid may pass from inlet 24 upwardly through openings 36 to exert a force on the bottom of sealing member 86 to displace piston 80 upwardly, against the force of spring 100, to its indicating position. In order to insure accuracy of the measurement, it will be appreciated that the lower wall surfaces of body sealing portion 88 slideably and sealingly engage opposed surface portions of sleeve 64 and housing 12 upon movement of piston 80. Furthermore, in order to prevent blockage of passage openings 36 during downward movement of piston 80, the upwardly projecting posts 38 of flange 34 are adapted to be received within groove 98 of sealing member 86 to limit the downward movement of piston 80 and thereby define the rest or non-indicating position thereof In the preferred embodiment, the inner wall of transparent housing portion 20 has suitable markings or other indicia thereon, represented generally by numeral 102, which indicia is exposed to view through the housing. Indicia 102 is illustrated as numerical markings ranging between 20 and 32 which, upon calibration of the apparatus and the components thereof, are intended to represent p.s.i. readings. In operation, the top edge of piston 80 may be colored to provide a sharp contrast between said edge and indicia 102 whereby the extent to which piston 80 moves upwardly relative to housing portion 20 is representative of the pressure within tire 16. Alternatively, the indicia may be positioned on the neck portion 48 of collar 44, as represented generally by numeral 102' in FIG. 9. In this regard, it will be appreciated that piston 80 is disposed for movement between neck portion 48 and upper housing portion 20 whereby the top edge of said piston and the indicia 102 on neck portion 48 are exposed to view through transparent housing portion 20. The indicia 102, as well as the top edge of piston 80, may also be of fluorescent marking to facilitate use of the apparatus at night or in poor lighting conditions.

In assembly of the apparatus, sleeve 64 having only its bottom end 66 bent as indicated in the drawings is slid into housing 12 through the bottom opening of housing portion 18. The housing is then mounted on a suitable jig in an upright position, bearing in mind that at this point, the body portion of sleeve 64 is of cylindrical shape for its entire upper longitudinal extent. Piston 80 and sealing member 86 are now joined together to form a sub-assembly, and are slid into housing 12 through the top opening of housing portion 20 and over the top end of sleeve 64. Spring 100 is next slid over the top end of sleeve 64 whereupon collar member 44 is positioned in place on top of housing portion 20 with its neck portion 48 located between spring 100 and the inner wall surfaces of piston 80. A spreader tool or the like may now be used to bend the top end 66 of sleeve 64 to the position indicated in the drawings to secure collar member 44 in nested relation to housing 12. Plunger 68 is then inserted in sleeve 64 whereupon collar member 56 is slid over plunger head 70 and cemented in place on top of collar member 44. The assembly apparatus may now be mounted on tire valve assembly 14 as illustrated in FIG. 1.

Except for seals 32, sealing member 86 and ring 76, which are formed of rubber or other resilient suitable material, and the spring 100 which is constructed of a metal material, the remaining components of the apparatus are formed of a plastic material. The overall length of the apparatus is less than 2.0 inches (5.1 cm.) so that it can be conveniently left on the tire valve when not in use.

In operation of apparatus 10 to measure the air pressure within tire 16, reference is directed to FIG. 6 wherein a manual force, represented by the phantom line drawing of finger, is exerted on plunger head 70 to displace plunger 68 downwardly to a first operate position against the force of the spring within the tire valve assembly. Such displacement serves to open the tire valve and permit air pressure within tire 16 to flow into inlet chamber 24. The pressure passes predominantly through flange openings 36 whereby a force is exerted on sealing member 86 to displace piston 80 upwardly against the force of spring 100 to its indicating position when the pressure is above a predetermined amount. It will be appreciated that when plunger 68 is in its first operate position, sealing ring 76 closes off fluid communication between chamber 62 and the outside atmosphere. Furthermore, sealing engagement of depending walls 94, 96 of sealing member 86 with the opposed surface portions of sleeve 64 and housing 12 serves to prevent the air pressure from passing around piston 80 which would affect the accuracy of the measurement. Movement of piston 80 to its indicating position is not affected by fluid pressure above sealing member 86 and between sleeve 64 and housing 12 in view of the vent openings 50 formed in the bottom and side surfaces of collar 44 and flange 46, respectively. The extent to which piston 80 moves relative to indicia 102 is observed through transparent upper housng portion 20 and is representative of the pressure within tire 16. Upon removing the force from plunger head 70, the component parts resume their respective normal or rest positions illustrated in FIG. 2.

The invention further enables pressure from an external source to be transmitted to the tire through apparatus 10 without having to remove the apparatus from the tire valve assembly. Thus, referring to FIG. 7, assuming that a measurement of the pressure within tire 16 reveals that the tire is underinflated, the outlet chuck 104 from a conventional air pump or compressor at a service station is fitted over collar 56 and seated on collar member 44. Chuck 104 may be provided with a sealing ring 106 and is constructed having a pin valve 108 which is adapted to engage with plunger head 70 in its mounted position. In operation, a manual force exerted on chuck 104, as indicated by the top-most arrows in FIG. 7, serves to displace plunger 68 downwardly beyond its first operate position to a second operate position which, in addition to engaging and opening the tire valve, also serves to provide a path for the flow of fluid from the external source to the source inlet chamber 62 by means of flange grooves 73. Fluid communication between tire 16 and source inlet chamber 62 is provided by means of sleeve 64. It is to be noted that, by reason of the greater internal diameter of collar flange 52 as compared to the corresponding diameter of nested collar 56, seal 76 is rendered inoperative to close off source inlet 62 when plunger 68 is in its second operate position. Thus, air is permitted to flow from the external source into source chamber 62 and down sleeve 64 to fluid chamber 24 and into the tire. FIG. 7 also shows that some of the air passing down sleeve 64 will initially pass back through flange openings 36 and displace piston 80 upwardly. However, once piston 80 has reached its maximum distance of travel, predominantly all of the air from the external source entering the apparatus will pass into the tire. Upon removing chuck 104, another pressure measurement can be taken and, if satisfactory, the component parts will resume their respective normal or rest positions as illustrated in FIG. 2.

FIG. 10 illustrates another embodiment of the sealing member represented generally by numeral 110 which is constructed as being integrally formed with the piston indicator of the apparatus. In other words, sealing member 110 could be used in place of the piston 80 and sealing member 86 sub-assembly and thereby reduce the number of component parts in the apparatus. Thus, sealing member 110 is constructed having a lower body sealing portion 112 and an upstanding collar indicator portion 114. The bottom edge is further formed having spaced circumferentially depending walls 116, 118 defining a groove 120 therebetween. Walls 116 taper outwardly from body portion 112 to the bottom edge whereas the walls 118 taper inwardly. The construction is such that sealing member 110 is formed of resilient material with resilient walls 116, 118 disposed in diverging relation to one another.

Accordingly, there is thus provided a novel indicating apparatus which patentably distinguishes over the heretofore known tire gauges and which satisfies all of the stated objectives. While preferred embodiments of the invention have been shown and described in detail, it will be readily understood and appreciated that numerous omissions, changes and additions may be made without departing from the spirit and scope of the invention.

I claim:

1. An indicating apparatus for measuring the pressure of a fluid within a container, said apparatus comprising:
   a. a housing one end adapted to be mounted on a valve assembly communicating with the container, said housing further having a range of scale indicia from a minimum value to a maximum value representative of the pressure of the fluid within said container between a predetermined range of pressures;
   b. a collar having a through-opening mounted to another end of said housing;
   c. a sleeve supported within said housing, the opposite ends of said sleeve extending outwardly in overlying and clamping relationship to portions of said housing and said collar, respectively, to secure said collar in nested relation to said housing;

c. a plunger reciprocally supported within said sleeve for movement between an inoperable position wherein the valve of the container is closed and an operate position wherein said plunger engages and opens said valve to provide a path for the flow of the fluid from the container into said housing, said plunger having an end accessible through the opening in said collar;

d. indicator means supported within said housing for movement by the fluid from a non-indicating position to an indicating position when the pressure of said fluid is above a predetermined amount, said indicator means being movable relative to said scale indicia to provide a reading between said minimum and maximum values representative of the pressure of the fluid within said container when said pressure is within said predetermined range of pressures;

e. said having a passage for directing the fluid to said indicator means when said plunger is in its operate position; and f. said housing having means for viewing the indicator means in its indicating position.

2. The indicating apparatus as recited in claim 1, wherein said housing has interior walls, and wherein said indicator means is positioned between said sleeve and the interior walls of said housing.

3. The indicating means as recited in claim 2, wherein said indicator means has sealing means disposed for conjoint movement therewith, one end of said sealing means having a pair of spaced depending walls slideably and sealingly engaging opposed surfaces of said sleeve and an interior wall of said housing.

4. The indicating apparatus as recited in claim 3, further comprising abutment means within the housing for engaging and limiting the movement of said indicator means to define the non-indicating position thereof.

5. The indicating apparatus as recited in claim 4, wherein the spaced depending walls of said sealing means define a groove therebetween; said abutment means comprising a projection received within said groove when said indicator means is in its non-indicating position.

6. The indicating apparatus as recited in claim 1, wherein said indicator means comprises:
   a. a piston supported for movement between said non-indicating position and said indicating position, said piston having a marker exposed to view through the viewing means of said housing for reading said scale indicia when said piston is in its indicating position;
   b. sealing means on said piston disposed for conjoint movement therewith; and
   c. a compression spring supported within said housing and biasing said piston to its non-indicating position when said plunger is in its inoperable position.

7. The indicating apparatus as recited in claim 1, wherein said housing viewing means comprises a transparent wall portion; said indicator means in its indicating position being exposed to view through said transparent wall portion.

8. An indicating apparatus for measuring the pressure of a fluid within a container and for transmitting pressure from an external source to said container; said apparatus comprising:
   a. a housing having one end adapted to be mounted on a valve assembly communicating with the container, said housing having a transparent wall portion;
   b. said housing further having a fluid inlet for the introduction of the fluid from the container and a source inlet for the introduction of fluid from the external source;
   c. a collar having a through-opening mounted to another end of said housing, and defining the source inlet of said housing;
   d. a sleeve supported within said housing connecting said fluid inlet to said source inlet, the opposite ends of said sleeve extending outwardly in overlying and clamping relationship to portions of said housing and said collar, respectively, to secure said collar in nested relation to said housing;
   e. a plunger having an end accessible through the opening in said collar, and being reciprocally supported within said sleeve for movement between;
      i. an inoperable position wherein the valve of the container is closed;
      ii. a first operate position wherein said plunger engages and opens said valve to provide a path for the flow of fluid from the container into the fluid inlet of said housing, and
      iii. a second operate position wherein said plunger engages and opens said valve and wherein a path is provided for the flow of fluid from the external source into the source inlet of said housing;
   f. sealing means mounted on said plunger operative to seal the source inlet when said plunger is in its first operate position;
   g. said housing further having a range of scale indicia from a minimum value to a maximum value representative of the pressure of the fluid within said container between a predetermined range of pressures;
   h. indicator means supported within said housing for movement by the fluid from a non-indicating position to an indicating position when the pressure of said fluid is above a predetermined amount, said indicator means being movable relative to said scale indicia to provide a reading between said minimum and maximum values representative of the pressure of the fluid within said container when said pressure is within said predetermined range of pressures;
   i. said indicator means being exposed to view through said transparent wall portion when said indicator means is in its indicating position;
   j. said housing having a passage for directing fluid from the fluid inlet to said indicator means when said plunger is in its first position; and
   k. said plunger sealing means being inoperative to seal the source inlet when said plunger is in its second operate position for directing fluid from the source inlet to the container through said housing.

9. The indicating apparatus as recited in claim 8, wherein said indicator means comprises: 'a. a piston supported for movement between said non-indicating position and said indicating position, said piston having a marker exposed to view through the transparent wall portion of said housing for reading said scale indicia when said piston is in its indicating position;
   b. sealing means on said piston disposed for conjoint movement therewith; and
   c. a compression spring supported within said housing and biasing said piston to its non-indicating position when said plunger is in its inoperable position.

* * * * *